United States Patent [19]
Presley

[11] 3,770,997
[45] Nov. 6, 1973

[54] ROTARY ACTUATOR
[75] Inventor: Rex W. Presley, Livonia, Mich.
[73] Assignee: The Bendix Corporation, Southfield, Mich.
[22] Filed: Aug. 24, 1971
[21] Appl. No.: 174,342

[52] U.S. Cl. ................................................. 310/82
[51] Int. Cl. ............................................... H02k 7/10
[58] Field of Search...................... 310/82, 83, 269, 310/84, 67, 154, 49, 162; 318/138

[56] References Cited
UNITED STATES PATENTS

| | | |
|---|---|---|
| 3,561,006 | 2/1971 | Humphreys............................ 310/49 |
| 3,456,139 | 7/1969 | Newell................................... 310/49 |
| 3,452,227 | 7/1969 | Welch.................................... 310/67 |
| 2,857,536 | 10/1958 | Light...................................... 310/82 |
| 3,512,019 | 5/1970 | Durand.................................. 310/67 |
| 3,331,974 | 7/1967 | Proctor.................................. 310/49 |

*Primary Examiner*—R. Skudy
*Attorney*—John R. Benefiel et al.

[57] ABSTRACT

A rotary actuator of the type in which an eccentrically positioned floating rotor is orbited about the axis of an output member drivingly engaged therewith and adapted to be driven by the rotor orbiting motion, featuring an arrangement providing magnetic forces acting on the rotor so as to maintain the output member and rotor in engagement as the rotor orbits about the output member axis, taking the form of permanent ring magnets disposed to create a toroidal magnetic field about the output member axis so as to magnetically attract the rotor in a direction to maintain its engagement with the output member as it orbits about the output member axis.

6 Claims, 6 Drawing Figures

PATENTED NOV 6 1973 3,770,997

INVENTOR
REX W. PRESLEY

BY John R Benefiel
ATTORNEY

PATENTED NOV 6 1973

INVENTOR
REX W. PRESLEY

BY John R Benefiel
ATTORNEY

INVENTOR
REX W. PRESLEY
BY John R Benefiel
ATTORNEY 3,770,997

ROTARY ACTUATOR

BACKGROUND OF THE INVENTION

1. Field of the Invention

This invention concerns rotary actuators and more specifically rotary actuators of the eccentric gear type which have a floating rotor orbited about the output axis by hydraulic or electromagnetic means.

2. Description of the Prior Art

Eccentric planetary reduction gearing has long been known and utilized in which an eccentrically positioned rotor is orbited about an output gear and by reacting with a stationary gear, the rotor may drive the output member at a greatly reduced speed. Classically, the rotor is orbited by means of an eccentric cam, but in past years hydraulic and electromagnetic arrangements have been devised to induce the rotor orbiting movement, examples of which are the Light U.S. Pat. No. 2,857,536 and Mossbacher U.S. Pat. No. 3,106,163. In all of these approaches the rotor is constrained by means of a bearing contact or other structural constraint to move through the orbit proper for the geometry of the particular gearset, as the gear teeth reaction tends to cause disengagement between the rotor and the output member when a load is driven thereby. In the cam drive instance, the cam itself positions the rotor, while in the Light patent, a bearing supported crank is utilized, and in the Mossbacher patent the tips of the "gerotor" teeth slide over one another and lock the rotor in engagement with the output member in any given position.

Recently it has been proposed to "float" the rotor in the units which utilize hydraulic or electromagnetic actuation, that is, eliminate any bearing support therefor since the rotor is the only high speed part in this type of unit and to eliminate bearings or other sliding contact between it and other structure would provide substantial improvements in efficiency and performance.

One such approach is disclosed in Ser. No. 158,757 assigned to the assignee of the present application in which a hydraulic "hold-in" force is generated.

Another approach is disclosed in the U.S. Pat. to Welch No. 3,452,227 which relies on the basic electromagnetic means of orbiting the rotor to also maintain the rotor in engagement with the output gear and the reaction gear. This approach has also been combined with a "gear overlap" arrangement disclosed in U.S. Pat. No. 3,516,765, the basic electromagnetic actuation means tending to reduce the tooth loading inherent in the arrangment referred to.

The basic electromagnetic actuation means is designed primarily to provide the orbiting forces and only a component thereof is available to provide the hold-in force, and further the flux path suitable for generating the orbiting forces is relatively inefficient for generating magnetic forces in the direction of the hold-in forces, and hence to increase the hold-in force for high torque applications by increasing the power level of the basic electromagnetic orbiting means is inefficient.

Hence, it is an object of the present invention to efficiently provide hold-in forces acting on a floating rotor in an eccentric gearset of the type described.

SUMMARY OF THE INVENTION

This and other objects which will become apparent upon a reading of the following specification and claims is accomplished by providing means for generating magnetic forces acting in a direction so as to exert pure hold-in forces on the rotor as it orbits about the output member axis.

DETAILED DESCRIPTION

Figures 1, 2:
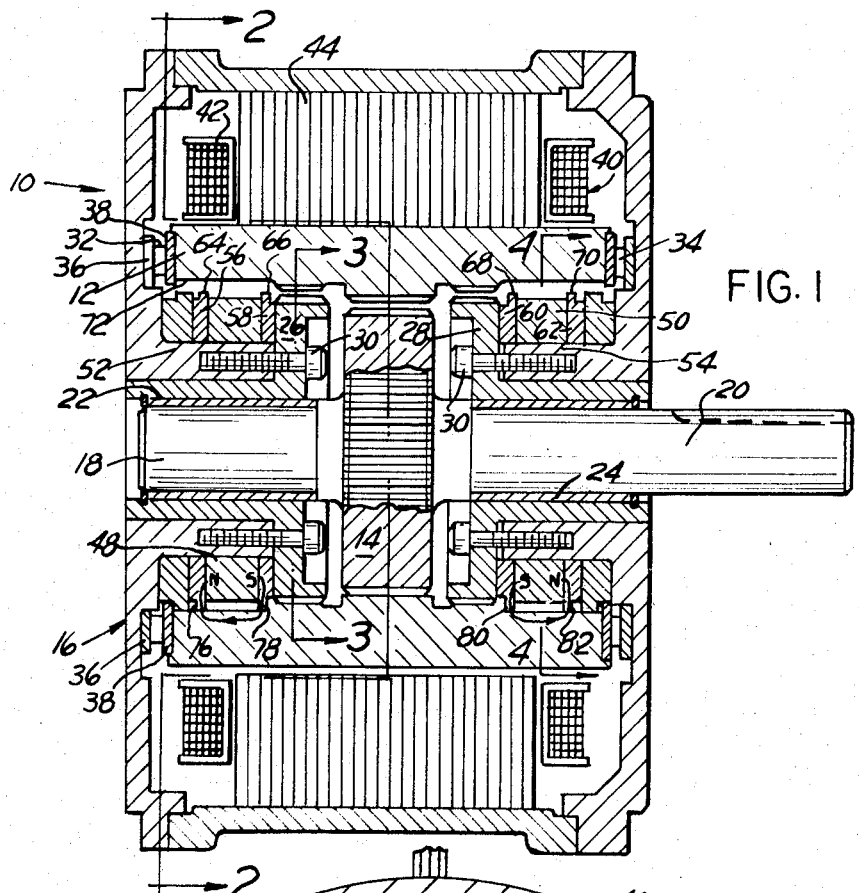
FIG. 1 is a view of an actuator according to the present invention in partial longitudinal section.
FIG. 2 is a view of the section taken along the line 2—2 in FIG. 1.

In the following detailed description, certain specific terminology will be utilized for the sake of clarity and specific embodiments will be described in order to provide a complete understanding of the invention, but it is to be understood that the invention is not so limited and may be practiced in a variety of forms and embodiments.

Referring to the drawings, and particularly FIGS. 1–4, an actuator 10 incorporating the principle of the present invention is depicted in partial longitudinal section.

The actuator includes a rotor 12 constructed of a ferromagnetic material which is disposed in driving engagement with an output gear 14 as shown in FIG. 2 and which is supported in the housing 16 by means of integral shafts 18 and 20 and bearings 22 and 24, respectively. Shaft 20 is shown as the output of the actuator 10.

Figure 3:
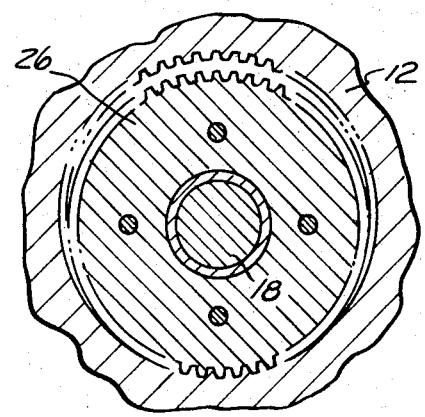
FIG. 3 is a view of the section taken along the line 3—3 in FIG. 2.

A pair of reaction gears 26 and 28 are also provided fixed to the housing 16 by cap screws 30, each drivingly engaged with the rotor 12 as indicated in FIG. 3.

The rotor 12 is positioned axially by means of a pair of thrust bearings 32 and 34 or other structural constraints and is allowed to float, positioned purely by other forces acting thereon.

One of these other forces acting on the rotor is the magnetic force exerted by a series of electromagnets 40 disposed about the interior of the housing on an axis coinciding with that of the output gear 14. These electromagnets include a series of coils 42 surrounding laminated cores 44, which protrude inwardly from the coils 42 into the interior of the housing, terminating in radiused end portions 46.

Figure 4:
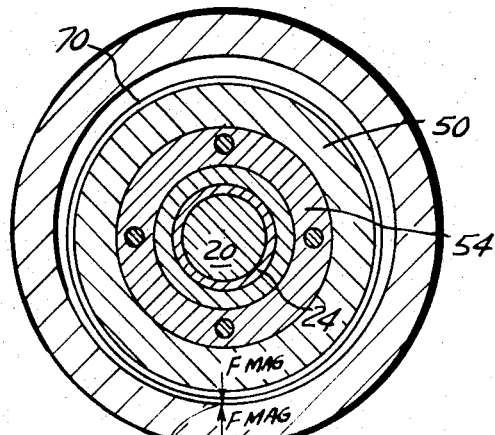
FIG. 4 is a view of the section taken along the line 4—4 in FIG. 1.
Figure 5:
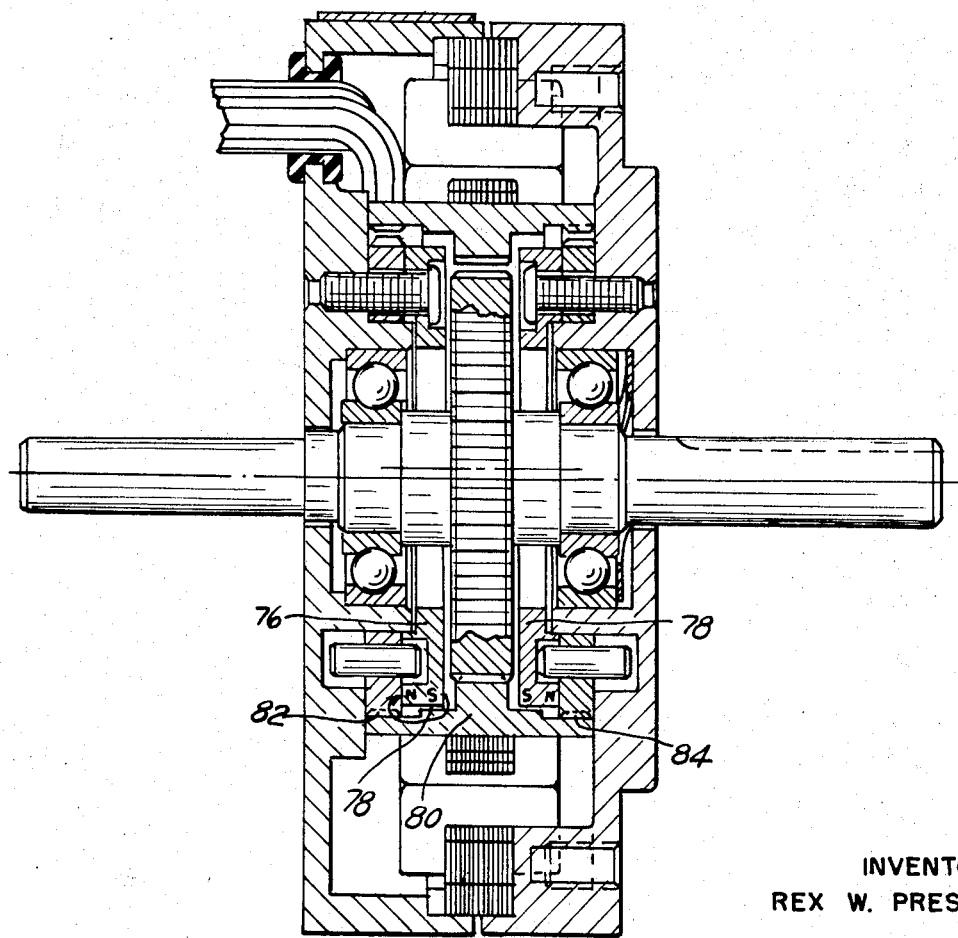
FIG. 5 is a view in partial longitudinal section of an alternate embodiment of the present invention.

As depicted schematically in FIG. 5, these coils are supplied with electrical power via a stepper switch and power source 48 so as to be sequentially energized to cause the rotor 12 to be successively attracted to the various end portions 46 by the resultant magnetic field formed successively by the sequential energization thereof. This attraction causes the rotor 12 to assume a position in which its axis is eccentric to the centerline of the output gear 14 as shown in FIG. 4 and to orbit about the centerline of output gear 14 as it rolls from end portion to end portion of stator poles 44.

This orbiting motion with the rotor 12 reacting against the reaction gears 26 and 28, causes the output gear 14 to be driven so as to cause it to rotate at a greatly reduced speed in the manner now well known in the art.

Inasmuch as this combination is now well known and understood in principle by those skilled in the art, it is not felt necessary to describe in detail the theory of operation, the ratios obtained, the particulars of design and construction, and other such aspects of this device.

Referring to FIG. 2, it can be seen that the point of engagement of the rotor 12 and output gear 14 and thus the line of action of the separating forces, $F_{sep}$, which exist as a result of the reaction to the driven load and pressure angle of the tooth contact, occurs perpendicular to the end portions 46 of the presently and previously energized coils 42. Thus the next energized coil 42, either to the left or right as viewed in FIG. 2 depending on the direction of rotation will exert a magnetic force at a skewed angle to the point of contact, and hence only a component of the resulting magnetic forces will be in a direction to absorb the separating forces.

Furthermore, the magnetic lines of flux must pass through the air gap between the respective end portion 46 and the rotor 12 periphery.

Thus, the arrangement which provides for orbiting of the rotor 12 does not produce with maximum efficiency a magnetic hold-in force, as noted above.

In order to simply and efficiently produce a hold-in force, a pair of permanently magnetized ring elements 48 and 50 are provided adjacent the rotor 12 but concentric to the axis of the output gear and mounted on housing boss sections 52 and 54, respectively, between pairs of ferro-magnetic thrust rings 56, 58 and 60, 62 concentric thereto and also disposed on the boss sections. The polarity of the rings 48 and 50 are axially spaced as indicated in FIG. 4. Each of the thrust rings 56, 58 and 60, 62 have outwardly protruding portions 64 and 66, and 68, 70 which are of such a diameter that when the gear teeth of the rotor 12, output gear 14, and the reaction gears 26 and 28 are meshed, the portions 64, 66 and 68, 70 bear against inner surfaces 72 and 74 of the rotor 12 at the points 76, 78 and 80, 82 thereon corresponding to the angular position of the maximum gear mesh as depicted in FIGS. 1 and 4, which position is constantly shifting as the rotor 12 orbits about the axis of the output gear 14.

In operation, the permanently magnetized rings 48 and 50 create a toroidal magnetic field centered on the axis of the output gear 14 and thus exert a magnetic attraction on the rotor 12 about the periphery thereof, but this attractive force is very much greater at the point of contact of the thrust ring outer portions 76, 78 and 80, 82 since a closed ferromagnetic path for the lines of magnetic flux is defined by each magnetized ring 48, 50 and its associated thrust rings 56, 58 and 60, 62 and the rotor 12 itself, and the flux path is perpendicular to the inner rotor surfaces 72, 74 to thus maximize the magnetic forces acting on the rotor 12 in the radial direction. Thus, the resultant magnetic forces $F_{mag}$ are as indicated in FIG. 4.

Examination of FIGS. 2 and 4 shows that this resultant force is at the same point along the same line of direction as the separating forces $F_{sep}$, except oppositely directed. As the rotor 12 orbits this condition continues to exist, so that hold-in force is continuously generated to counteract the separation forces. Further, this force is generated efficiently as the magnetic force is directed solely along the line of action of the separating forces, and a magnetic flux path entirely through ferromagnetic material is provided.

Further, this effect has been created without the need for complex commutation mechanisms or excessive power consumption.

Figure 6:
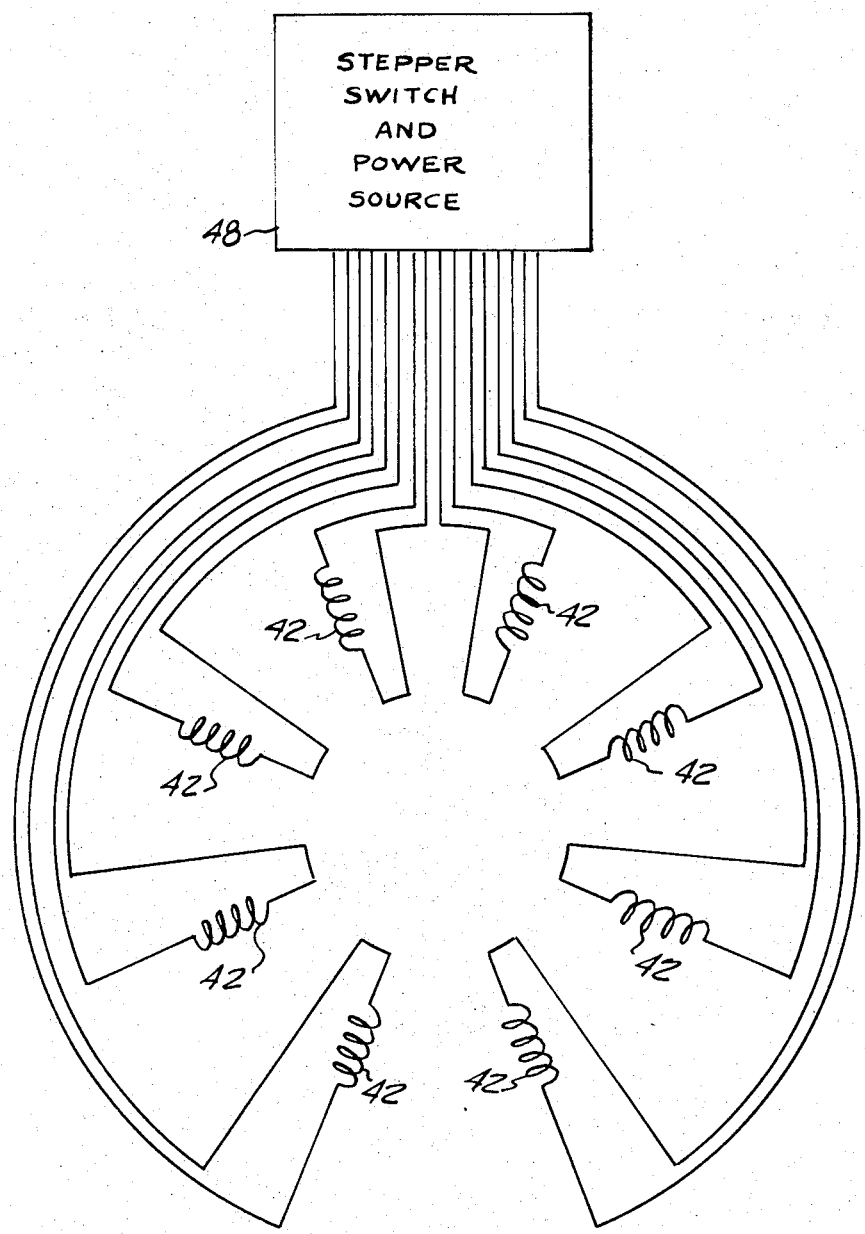
FIG. 6 is a schematic representation of the electromagnetic coils of the actuator of FIG. 1 together with a block diagram representation of a power supply and stepper switching circuitry.

Referring to FIG. 6, an alternate embodiment is depicted, also incorporated into an electromagnetically actuated device. In this embodiment permanently magnetized rings 76 and 78 are provided with a similar orientation of the magnetic poles as indicated.

However in this embodiment, the thrust washers are not included, and the creation of the required resultant magnetic force is a result of the narrowed gap 78 between the rotor 80 and the inner ends of the rings 76 and 78 and the meshing engagement at 82 and 84 between stationary gears 86, 88 and the rotor 80.

While this arrangement does provide a resultant magnetic force acting on the rotor 80 tending to hold it in mesh, the efficiency of the magnetic field in creating this force is not as high as in the first described embodiment, since an air gap 78 must be crossed, and the magnetic flux lines are not perfectly perpendicular to the rotor inner surface. However, this arrangement is extremely simple, involving only the magnetic rings themselves.

While the improvement of the present invention has been disclosed in the context of augmenting the hold-in forces created by an electromagnetically actuated device, it is not limited to this application. For example, this improvement could be used to augment other hold-in force arrangements, as the hydraulic or gear overlap arrangements referred to above. Furthermore, if the torque and other design requirements are such, the magnets could be used alone, for example in a hydraulically actuated unit to provide the entire hold-in force.

Similarly, many variations of this improvement itself are possible as to use electromagnets instead of the permanent magnets disclosed.

Therefore, what is claimed is:

1. An actuator comprising:
   a rotor;
   an output member;
   a fixed reaction member;
   means for orbiting said rotor about the axis of said output member in engagement therewith and with said reaction member to thereby drive said output member;
   magnetic field means creating a toroidal magnetic field said toroidal magnetic field extending about the axis of said output member proximate said rotor and such that as said rotor orbits about said axis the magnetic force produced by said toroidal magnetic field acting on said rotor is greatest at the angular position wherein said rotor is nearest said axis, said magnetic field means including a permanently magnetized ring substantially centered on said output member axis and proximate said rotor, whereby a resultant magnetic force is produced at said point aligned with the angular position of said rotor at said point.

2. The actuator of claim 1 wherein said magnetic field means further includes means providing a closed magnetic flux path defined in part by said rotor and entirely through ferromagnetic material in the vicinity of the point of engagement between said rotor and output member.

3. The actuator of claim 2 wherein said means providing a closed magnetic flux path includes at least one ferromagnetic ring element disposed concentric with an axially adjacent said permanently magnetized ring and engaging said rotor at the angular position of said rotors engagement with said output member, whereby said ring element defines in part a magnetic flux path through said rotor entirely of ferromagnetic material to create a resultant magnetic force action on said rotor in the vicinity of said angular position to thereby produce said hold-in force.

4. In an actuator of the type in which a rotor is orbited by an actuation means about the axis of an output member and in driving engagement therewith and with a reaction element to provide an output rotation of the output member the improvement comprising:

magnetic field means separate from said actuation means creating a resultant magnetic force acting on said rotor tending to maintain said rotor engagement with said output member, including means creating a toroidal magnetic field with said toroidal magnetic field extending about the axis of said output member proximate said rotor and such that as said rotor orbits about said axis the magnetic force acting on said rotor is greatest at the angular position wherein said rotor is nearest said axis, said means including a permanently magnetized ring substantially centered on said output member axis and proximate said rotor, whereby said resultant magnetic force is produced at said point.

5. The actuator of claim 4 wherein said magnetic field means further includes means providing a closed magnetic flux path defined in part by said rotor and entirely through ferromagnetic material in the vicinity of the point of engagement between said rotor and output member.

6. The actuator of claim 5 wherein said means providing a closed magnetic flux path includes at least one ferromagnetic ring element disposed concentric with and axially adjacent said permanently magnetized ring and engaging said rotor at the angular position of said rotors engagement with said output member, whereby said ring element defines in part a magnetic flux path through said rotor entirely of ferromagnetic material to create a resultant magnetic force acting on said rotor in the vicinity of said angular position to thereby produce said hold-in force.

\* \* \* \* \*